Aug. 13, 1946.  M. ZIEGLER  2,405,771
METHOD OF SYNCHRONIZING A PLURALITY OF OSCILLATIONS
Filed July 11, 1942  2 Sheets-Sheet 1

Marc Ziegler
INVENTOR.

BY

ATTORNEY.

Aug. 13, 1946.    M. ZIEGLER    2,405,771
METHOD OF SYNCHRONIZING A PLURALITY OF OSCILLATIONS
Filed July 11, 1942    2 Sheets-Sheet 2
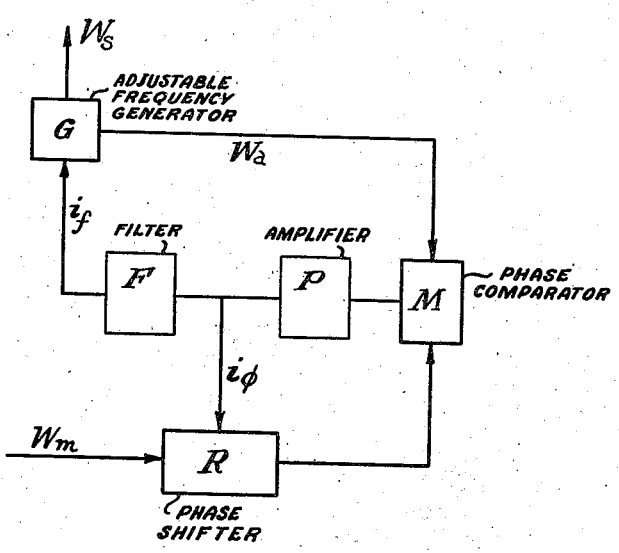
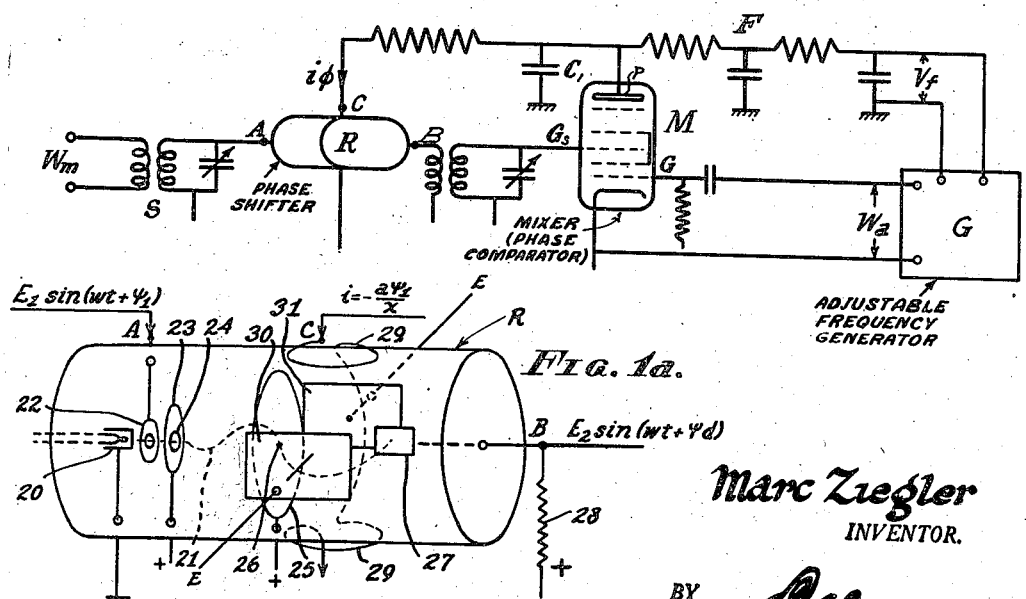
Marc Ziegler
INVENTOR.
BY
ATTORNEY.

UNITED STATES PATENT OFFICE 2,405,771

METHOD OF SYNCHRONIZING A PLURALITY OF OSCILLATIONS

Marc Ziegler, Buenos Aires, Argentina, assignor to Hartford National Bank and Trust Company, Hartford, Conn., as trustee Application July 11, 1942, Serial No. 450,584

5 Claims. (Cl. 250—36)

It is well known that the exact synchronization of oscillators with respect to an incoming oscillation is a problem which arises frequently in modern science and technique. The methods hitherto employed have been such as to call for relatively cumbersome equipment, or were restricted in their applications. It has been suggested that synchronization can be obtained by controlling the frequency of a local oscillator by means of the phase difference between the oscillator and the controlling signal. It has, however, heretofore been deemed evident that proper synchronization can be achieved only when the phase difference between the oscillator and the controlling signal does not exceed $$\pm \frac{\pi}{2}$$

This is obviously a considerable restriction of the region over which synchronization can be effected and maintained. Now, for certain purposes, large phase differences between two waves which ought to be synchronized, are a normal feature of operation, so that the teaching of the prior art would lead to the abandonment of the frequency control on the basis of phase difference.

The present invention provides a new method of automatically synchronizing a wave, hereinafter referred to as an adjustable wave, with respect to a given wave, hereinafter referred to as the master wave, the frequency of which may be known or, more generally, unknown. The essence of the new method consists in controlling the frequency of the adjustable wave automatically in proportion to a small fraction of the phase difference between the adjustable wave and the master wave. The said small fraction is obtained by a process which I have denominated for convenience, shrinkage, which entails, in general, impressing on the adjustable wave a phase shift proportional to the phase difference between the adjustable wave and the master wave, to obtain a wave having with the master wave a phase difference of the fractional order required, and such phase difference will hereinafter be referred to as the shrunk phase difference. It will be apparent that, by the aid of the new method, adjustable waves may be synchronized with respect to master waves having phase differences of up to thousands of radians, whereby the restriction previously thought unavoidable, it is now eliminated. There are methods of synchronization or more truly, of automatic frequency control in which the above restriction does not exist either; it is then however impossible to achieve complete synchronization, for some frequency difference will always remain.

The new method of synchronization combines both advantages, namely, exact synchronization and wide range, to which can be added that either the adjustable wave or the master wave or both, may be either non-modulated, frequency modulated, or amplitude modulated. Hence, any desired combination or character of the adjustable wave and the master wave may be used.

For the purpose of the present specification the term "synchronizing frequency" will be used to indicate indifferently either the frequency, the central frequency or the carrier frequency of respectively a non-modulated, frequency modulated or amplitude modulated master wave, and the term "dependent frequency" will be used to indicate indifferently either the frequency, the central frequency or the carrier frequency of respectively a non-modulated, frequency modulated or amplitude modulated adjustable wave. In this sense of the words it will be understood that the synchronization is as between the synchronizing frequency and the dependent frequency. The synchronizing frequency will also be denominated "desired frequency" in certain instances.

Broadly speaking, the present invention has for its principal object to provide a method of synchronizing an adjustable wave with respect to a master wave, between which waves there is a phase difference, by subjecting one of said waves to a phase shift to produce a shrinkage of the phase difference, and controlling the frequency of the adjustable wave by means of a quantity univocally related to the shrunk phase difference.

Another object of the present invention is to provide a method of synchronizing an adjustable wave originating in a generator with respect to a master wave, between which waves there is a phase difference, by subjecting one of said waves to a phase shift to produce a treated wave having a shrunk phase difference in a relation of proportionality to the said phase difference, applying the other of said waves and the treated wave simultaneously to a phase comparison device to obtain an output depending univocally on the phase difference, and controlling the frequency of the adjustable wave by impressing on the generator an electrical quantity proportional to said output.

Another object of the present invention is to provide a method of synchronizing an adjustable wave originating in a generator with respect to a master wave, between which waves there is a phase difference, by subjecting one of said waves to a phase shift in a phase shifting device, to produce a treated wave having a shrunk phase difference in a relation of proportionality to the said phase difference, applying the other of said waves and the treated wave simultaneously to a phase comparison device to obtain an output depending univocally on the phase difference, controlling the amount of phase shift impressed on the wave applied to the phase shifting device by impressing on the phase shifting device the output of the phase comparison device, and controlling the frequency of the adjustable wave by impressing on the generator an electrical quantity depending proportionally on said output.

A further object of the present invention is to provide a method of synchronizing with respect to a given master wave which comprises a synchronizing frequency, an adjustable wave which originates in a generator and is a sinusoidal function of the sum of two angles one of which represents a desired frequency equal to the synchronizing frequency, and the other of which represents a variation of phase with time with respect to said desired frequency angle, whereby a phase difference is produced between the master and adjustable waves, the method consisting in the steps of passing the adjustable wave through a phase shifting device to impress on the adjustable wave a phase shift angle, whereby to obtain from said phase shifting device a resultant which is a sinusoidal function of the sum of two angles one of which is the desired frequency angle and the other of which is a remainder angle corresponding to the difference between the phase variation angle and the phase shift angle, controlling the phase shift angle to maintain it nearly equal to the phase variation angle and produce a remainder angle representing a shrinkage of the phase difference between master wave and adjustable wave, and in a relation of proportionality to said phase difference, impressing the resultant of the phase shifting generator on a phase comparison generator simultaneously with the master wave to obtain an output depending univocally on said phase difference, and impressing on the generator an electrical quantity depending on said output to control the frequency in the generator.

A further object of the present invention is to provide in a method of the type described in the preceding paragraph, automatic control of the phase shift angle, by impressing on the phase shifting device the resultant output of the phase comparison device, whereby a phase shifting current is provided which is in a relation of proportionality to the remainder angle.

A still further object of the present invention is to provide, in a method of automatically synchronizing an adjustable wave with a master wave including a synchronizing frequency, said adjustable wave having reached a relatively large phase difference with respect to said synchronizing frequency, the step of producing an oscillating quantity having a shrunk phase difference which shall be a small fraction of the relatively large phase difference, by passing one of said waves through a controllable phase shifting device, simultaneously impressing on a phase comparison device the other wave and the output of the phase shifting device, and automatically controlling the phase shifting device by impressing thereon the output of the phase comparison device.

These and other objects and advantages will become more clearly apparent in the course of the following detailed description of the invention, in which reference is had to the accompanying drawings.

In the drawings:

Fig. 1a illustrates one form of phase shifting device suitable for the purposes of my invention.

Fig. 3a is a modification of the diagram of Fig. 3, and

Fig. 4 is a connection diagram of a possible practical embodiment operating in accordance with the method of this invention.

In the foregoing general statement of the invention, reference has been made to a phase shifting device, and it will be seen that a phase shifting device will be an essential feature of a circuit adapted to operate according to the present invention. For these reasons, although the specific construction or design of the phase shifting device is no concern of the present invention, since apparatus capable of giving the desired results is at present available, it is thought advisable, for a better understanding of the new method of synchronizing, to explain briefly what is here meant by a phase shifting device and to illustrate a suitable form of such a device.

Figure 1:
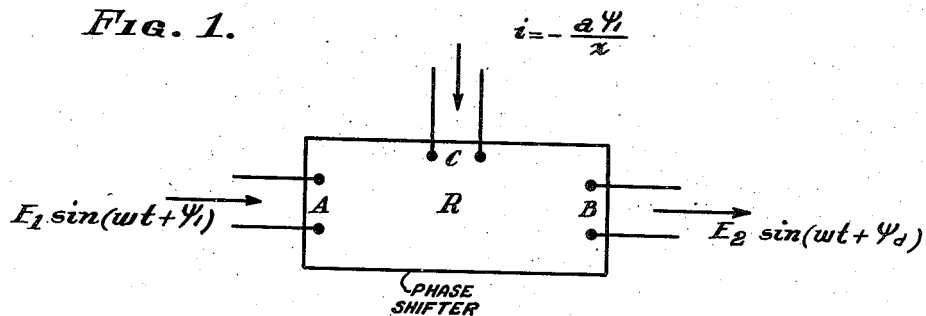
Fig. 1 is a diagram illustrating the effect of a phase shifting device on an adjustable wave which is a sinusoidal function of the sum of a desired angle and a phase variation angle.

A phase shifting device, represented diagrammatically by the rectangle R in Fig. 1, comprises input terminals A, output terminals B and control terminals C, and has an internal arrangement such that if a tension $v_1(t)$ is applied to the terminals A, there will appear at the output terminals B, $t_r$ seconds later, a tension $$v_2 = p v_1(t - t_r)$$

$p$ being a proportionality factor and $t_r$ being at each instant proportional to an electrical quantity applied to the control terminals C.

A device suitable for use as a phase shifting device in the present invention has been described and claimed in Ed. Labin's application Ser. No. 436,574, filed March 26, 1942, now Patent Number 2,372,210, issued March 27, 1945, as a phase modulation tube. Such a device is shown in Fig. 1a and comprises a thermionic tube provided with an indirectly heated cathode 20 generating an electron beam 21, a control grid 22 connected to input terminal A and controlling the intensity of the electron beam, and an accelerating plate 23 provided with an aperture 24 through which the electron beam penetrates into a transit region bounded by plate 23 and a diaphragm 25 the central hole 26 of which forms the point of origin for the electron beam with respect to a phase shifting region included between the diaphragm 25 and a collector electrode 27, and impedance 28 constituting the output terminal B of the phase shifting device.

The transit region included between accelerating plate 23 and diaphragm 25 is designed to control the velocity and trajectory of the electron beam before entering the phase shifting region and may comprise an electronic lens system or any other electron velocity filter of the known type. The phase shifting region includes an assembly of two serially connected coils 29—29 which create a retarding or phase shifting field for the electron beam, so that a variable current applied to the control terminal C thereof causes variations in the length of path of the electron beam in the phase shifting region and thereby determines the phase shift or retarding impressed on the electrical magnitude represented by the intensity modulated electron beam 21.

A pair of plates 30, 31 adapted to generate an auxiliary electric field E are provided to ensure that the electron beam impinges on the collector electrode 27 as described in the above-noted Labin application.

If as a measure of the time $t_r$ the phase of an oscillatory wave of angular velocity $\Omega$ be taken, the effect will be evidenced as a phase shift $\Psi_r = \Omega t_r$, and if a current $i$ be applied to the control terminal C, it can be shown that the practical formula for such a phase shifting device is $\Psi_r = \chi i$, where $\chi$ is the phase shifting constant of the device in radians per milliampere.

The adjustable wave to be synchronized with the synchronizing frequency of a master wave, will be written $E_1 \sin(\omega t + \Psi_i)$, where $\Psi_i(t)$ represents a variation of phase with time, and $\omega$ represents the desired synchronizing frequency. Suppose this wave applied to the input terminals A of the retarding device R. As hereinbefore set forth, the output it is desired to obtain from the retardation device is of the type $E_2 \sin(\omega t + \Psi_d)$, where $\Psi_d$ is a small fraction of $\Psi_i$. To obtain this result the phase shift $\Psi_r$ must be made equal to $-a\Psi_i$, and from the relationship given above, this implies that the current to be applied to the control terminals C must be made equal to $$-a \cdot \frac{\Psi_i}{\chi}$$

and the output wave can be written $$E_2 \sin(\omega t + \Psi_i - \Psi_r) = E_2 \sin(\omega t + \Psi_i - a\Psi_i) = E_2 \sin(\omega t + \Psi_d)$$

In this manner the phase variation angle $\Psi_i$ is shrunk to the fractional value $\Psi_d = (1-a)\Psi_i$, but it is required to so arrange matters that $\Psi_r$ is automatically maintained at a value nearly equal to $\Psi_i$ ($a \approx 1$) so that the shrunk phase difference $\Psi_d$ shall be very small. Consequently the controlling current $i$ must be arranged automatically to take an appropriate value.

Figure 2:
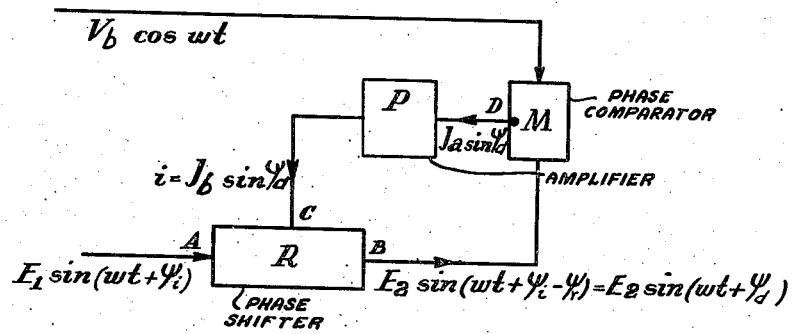
Fig. 2 is a diagram illustrating the automatic control of the phase shifting device, in accordance with the present invention.

The manner in which this condition can be complied with is shown diagrammatically in Fig. 2. If the output $E_2 \sin(\omega t + \Psi_d)$ of the retardation device or phase shifter R is impressed on a phase comparison device M, such for example as an ordinary mixer tube, on which there is simultaneously impressed a master wave $V_b \cos \omega t$, a current component is obtained at the output D of the phase comparison device M which will be proportional to $\sin(\omega t + \Psi_d - \omega t) = \sin \Psi_d$. The other resultants of the mixing can readily be filtered out as they are of high frequency and will not be considered in the following description. Thus, if $i_1 = I_a \sin \Psi_d$ is the current at the output of the phase comparison device, it may be passed through suitable and conventional amplifying devices indicated at P in Figure 2, to give the required current $i = I_b \sin \Psi_d$ for application to the control terminals C of phase shifter R.

The operation here involved is analogous to that of inverse feedback in an amplifier on the input of which a large signal is put, which is reduced automatically to a small value by subtraction of a tension originating from the output.

To demonstrate the applicability of this step to cases of large differences of phase, i. e. where $\Psi_i$ may assume large values, it may here be mentioned that it can be shown, by calculation, that $$\Psi_d \approx \Psi_i / A \qquad (1)$$

where A is equal to the number of radians phase shift corresponding to $\Psi_d = 1$ radian, provided that $\Psi_d < \frac{1}{4}$ radian and $A \gg 1$. The divisor A may be written $A = \chi i'$ where $i'$ is approximately the current variation in the plate of the mixer corresponding to an increase of $\Psi_d$ of 1 radian. It is readily possible to make $\chi$ of the order of hundreds of radians per milliampere and $i'$ of the order of milliamperes, so that a large value of A may easily be obtained, and Expression 1 applied. If $A = 8,000$, to a variation of $\Psi_i$ from 0 to 2,000 radians, there will correspond a variation of $\Psi_d$ of only $2,000/8,000 = \frac{1}{4}$ radians, so that with the supposed value of A, variations in $\Psi_i$ of 2,000 radians may be tolerated. Said value of A is by no means a limiting value in practice, so that the range of toleration may be considerably increased. Such wide tolerance is, as will hereinafter appear, essential for the operation of the novel method of synchronization.

The arrangement of Fig. 2 does not, of course, permit synchronism to be obtained. It leads only to a shrinkage of the phase variation and a proportional reduction of the difference between desired frequency and the frequency of the treated wave. Moreover, too large a frequency difference appears as if identical with a steadily increasing phase difference at a rate in radians per second which is too fast to allow the increase to be kept shrunk an appreciable time within the limitation $$\Psi_d < \frac{\pi}{2}$$

so that the above described results cannot be secured. A control of the adjustable wave proportionally to the shrunk phase difference however, will keep the variation within the afore-said limits. A numerical example will make this clear. If measurement is commenced at some moment of equal phase, a frequency difference of 1,000 C./S. represents a steadily increasing phase difference at the rate of $2\pi \cdot 1,000$ radians/sec., where $2\pi \cdot 1,000$ is the value to be assigned to $\Psi_i$ after 1 second. With the above value of A in mind, the shrunk phase shift would, after applying the above described step of the present method, be only $$\frac{2\pi \cdot 1,000}{8,000}$$

i. e. less than 1 radian/sec. This shrunk phase shift would, as stated above, produce a steadily increasing phase difference, but the upper value which $\Psi_d$ may not exceed for successful operation, namely $\pi/2$, would be reached only after the lapse of an appreciable time of the order of one second. Thus it is possible to check the steady increase of $\Psi_d$ before the critical value is reached, by applying a correcting factor to the source of the adjustable wave.

Figure 3:
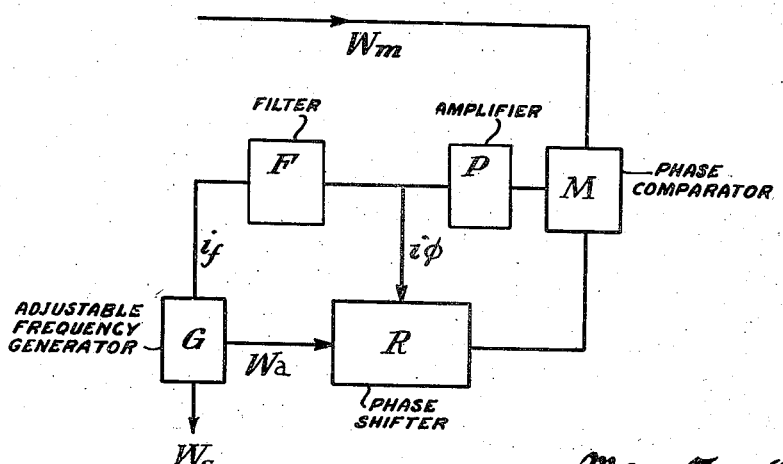
Fig. 3 is a diagram illustrating the method of the present invention of obtaining the synchronized oscillation.

Fig. 3 shows how this adjustment may be realised by making the frequency of the adjustable wave dependent univocally on the output of the phase comparison device M, generally on a current depending univocally on said output. The adjustable wave $W_a$ is generated in a generator G, and is impressed as above on a phase shifting device R, the output of which is impressed on a phase comparison device M simultaneously with the master wave $W_m$. The output of the phase comparison device M is impressed (after passing through an amplifier P) on the control terminals C of the phase shifting device, in the form of the phase shift current $i\phi$ and is likewise impressed (after passage through a filter F) in some convenient form, as a frequency control current $i_f$ or other quantity dependent univocally on the output, on the generator G.

It will readily be understood that, when the correct sense of control is chosen, a stable adjustment must result, where $\Psi_d$ and hence $\Psi_r$ and $\Psi_i$ become constants. This means equality of the synchronising and dependent frequencies.

The time required for adjusting the frequency of the adjustable wave to the correct value can be made as small as desired by providing for a large influence of $i$ on the frequency of the adjustable wave, that is to say, by making the arrangement such that for a small variation in the current $i$, say of the order of 1 ma., a relatively large variation of said frequency, say of the order of kilocycles per second, is obtained.

For the control of the frequency of the adjustable wave, any one of the numerous methods known in radio technique may be employed. Thus mechanical variation of one of the circuit elements of the source of the adjustable wave, or variation of the electrical constants of the vacuum tubes of such circuits may be adopted, provided that in all cases the variation is under the control of the quantity taken from the output of the phase comparison device and univocally dependent on said output.

With such an arrangement, an adjustable wave, for example the output of a local oscillator, which, in the absence of frequency control would show variations of frequency from the desired value, which are not excessively rapid, and say of the order of kc./s., can be synchronized perfectly provided that a small change in $\Psi_d$ corresponds to a frequency control also as large as several kc./s.

If the frequency of the master wave fluctuates in time, the arrangement described for performing the method of the present invention, would tend to force the frequency of the adjustable wave to follow these fluctuations. Rapid fluctuations may readily be prevented from influencing the automatic frequency control action by interposing a low-pass filter as indicated at F in Figure 3. In this way, synchronization may be obtained on the average value of the fluctuating frequency of the master wave. Such a filter likewise permits the adjustable wave to be frequency modulated, since, as explained above, the synchronization obtained is as between the synchronizing and dependent frequencies.

Those skilled in the art will readily perceive that the presence of amplitude modulation in either the adjustable or the master wave or in both, does not disturb the proper operation of the arrangement of Figure 3.

It will be clear to those skilled in the art that the shrinkage of the phase difference may be effected by applying the master wave instead of the adjustable wave to the phase shifting device. In such event, the phase shift control emanating from the phase comparison device M will be applied to the phase shifting device R as above described, but the frequency control also derived from the phase comparison device will obviously be applied to the generator of the adjustable wave. This arrangement is illustrated diagrammatically in Fig. 3a, in which the master wave $W_m$ and the adjustable wave $W_a$ of Fig. 3 have been interchanged and the consequential alterations in the diagram made.

The connection diagram of Figure 4 shows how the method of the present invention may be carried into practice in a very simple manner by the use of a phase shifting device R such as is shown in Fig. 1a and a mixer tube M. As shown, the master wave $W_m$ is impressed on the input terminals A of the phase shifting tube R after passing through the tuned circuit S. The output terminals B are connected to the signal grid $G_s$ of the mixer M. The adjustable wave $W_a$ derived from generator G which is to be synchronized with the master wave, is impressed on the grid G of the mixer. The plate $p$ of the mixer is connected to the control terminals C of the tube R and to the filter F from which the frequency controlling tension $v_f$ is applied to the frequency controlling element of the generator G of the adjustable wave.

The high frequency components of the plate current from the mixer pass through the condenser $C_1$. All the frequency components, up to the highest modulation frequency (if the master wave and/or the adjustable wave present frequency modulation) contribute to form the phase shifting current $i\phi$. Only slow variations, up to 30 C./S. are allowed to pass through the filter F.

Obviously, the master and adjustable waves may change places if it is desired to run the circuit according to the scheme of Fig. 3 rather than, as shown, according to the modification of Fig. 3a.

The synchronized adjustable wave will be taken off from output terminals of the generator G as indicated at $W_s$ in Figures 3 and 3a, and may be applied for any purpose for which a synchronized wave may be required. As previously stated, the present invention is not restricted to the use of any one particular type of phase shifting device, provided that the conditions of operation thereof are such as are hereinabove outlined. Evidently, according to the construction and design of the phase shifting device, the nature of the electrical quantity applied to the control terminals may vary. Thus instead of a phase shifting current $i\phi$, it may be a phase shifting voltage $v\phi$. Such and other similar variants, as will readily occur to those skilled in the art, are all held to lie within the scope of the present invention, as defined in the appended claims.

I claim:

1. The method of synchronizing an adjustable wave with a master wave having an initial phase difference with respect to the adjustable wave, comprising the steps of shifting the phase of one of said waves to produce a shrinkage of the phase difference between the waves, mixing the phase shifted wave and the other wave to produce an electrical potential substantially proportional to said shrunk phase difference, varying the frequency of said adjustable wave proportional to said electrical potential, and simultaneously controlling the amount of phase shift impressed on the phase shifted wave proportional to said electrical potential to thereby synchronize the said adjustable wave with said master wave and to maintain the phase difference between said waves at a value less than $\pi/2$ and proportional to the initial phase difference.

2. The method of synchronizing an adjustable wave with a master wave having an initial phase difference with respect to the adjustable wave, comprising the steps of shifting the phase of the adjustable wave to produce a shrinkage of the phase difference between the waves, mixing the phase-shifted adjustable wave with the master wave to produce an electrical potential substantially proportional to said shrunk phase difference, varying the frequency of said adjustable wave proportional to said electrical potential, and simultaneously controlling the amount of phase shift impressed on the phase shifted wave proportional to said electrical potential to thereby synchronize the said adjustable wave with said master wave and to maintain the phase difference between said waves at a value less than $\pi/2$ and proportional to the initial phase difference.

3. The method of synchronizing an adjustable wave with a master wave having an initial phase difference with respect to the adjustable wave, comprising the steps of shifting the phase of the master wave to produce a shrinkage of the phase difference between the waves, mixing the phase-shifted master wave and the adjustable wave to produce an electrical potential substantially proportional to said shrunk phase difference, varying the frequency of said adjustable wave proportional to said electrical potential, and simultaneously controlling the amount of phase shift impressed on the phase shifted wave proportional to said electrical potential to synchronize the said adjustable wave with said master wave and to maintain the phase difference between said waves at a value less than $\pi/2$ and proportional to the initial phase difference.

4. A circuit arrangement for synchronizing an adjustable electrical oscillation with a master oscillation having an initial phase difference larger than $\pi/2$ with respect to the adjustable oscillation, comprising means for varying the frequency of said adjustable oscillation responsive to an electrical potential, means for impressing on said adjustable oscillation a corrective phase shift to shrink the initial phase difference between said adjustable oscillation and the master oscillation to a value proportional to the said initial phase difference, means to electronically mix said phase-shifted adjustable oscillation and said master oscillation and produce an electrical potential substantially proportional to the said shrunk phase difference, means to apply said electrical potential to said frequency varying means, and means to simultaneously apply said potential to said phase shifting means to thereby vary the frequency of the generated adjustable oscillation proportional to said electrical potential and to maintain the phase difference between said oscillations at a value less than $\pi/2$.

5. A circuit arrangement for synchronizing an adjustable electrical oscillation with a master oscillation having an initial phase difference larger than $\pi/2$ with respect to the adjustable oscillation, comprising means for controlling the frequency of said adjustable oscillation responsive to an electrical potential, means to impress on said master oscillation a corrective phase shift to shrink the initial phase difference between the adjustable and the master oscillation to a value proportional to the said initial phase difference, means to electronically mix said phase shifted master oscillation and the adjustable oscillation and produce an electrical potential substantially proportional to the said shrunk phase difference, means to apply said electrical potential to said frequency control means, and means to simultaneously apply said potential to said phase shifting means to thereby vary the frequency of the adjustable oscillation proportional to said electrical potential and to maintain the phase difference between said oscillations at a value less than $\pi/2$.

MARC ZIEGLER.